J. M. DODGE.
DRIVE CHAIN LINKS.
APPLICATION FILED OCT. 20, 1910.
1,063,245.
Patented June 3, 1913.
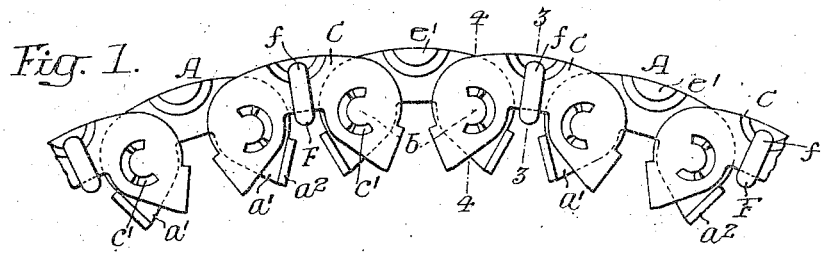

UNITED STATES PATENT OFFICE.

JAMES M. DODGE, OF PHILADELPHIA, PENNSYLVANIA, ASSIGNOR TO LINK-BELT COMPANY, OF CHICAGO, ILLINOIS, A CORPORATION OF ILLINOIS.

DRIVE-CHAIN LINKS.

1,063,245. Specification of Letters Patent. Patented June 3, 1913.

Application filed October 20, 1910. Serial No. 588,061.

*To all whom it may concern:*

Be it known that I, JAMES M. DODGE, a citizen of the United States, residing in Philadelphia, Pennsylvania, have invented certain Improvements in Drive-Chain Links, of which the following is a specification.

This invention relates to certain improvements in drive chains made of a series of plates forming links, the plates having teeth which engage the teeth of sprocket wheels. The links of the chain are connected together by pivot pins. Heretofore, the general practice has been to make pivot pins of such material that they can be riveted over the end link plates so as to hold the several plates in position.

The main object of the present invention is to make the pivot pins of hard metal and to hold the link plates independent of the pivot pins.

A further object of the invention is to utilize the end link plates to hold the pivot pins in proper position so that a plain cylindrical bar of hardened metal can be used as the pivot pin.

In the accompanying drawings:—Figure 1, is a side view of a drive chain illustrating my invention; Fig. 2, is a plan view; Fig. 3, is a sectional view on the line 3—3, Fig. 1; Fig. 4, is a sectional view on the line 4—4, Fig. 1; Fig. 5, is a perspective view of one of the intermediate link plates; Fig. 6, is a perspective view of one of the end link plates; Fig. 7, is a perspective view of one of the clips; Fig. 8, is a perspective view of a pivot pin; and Fig. 9, is a view of a modification of one of the clips.

A—A are the link plates of the chain. These plates are made as indicated in Fig. 5, having openings $a$ for the passage of the pivot pins $b$. The link plates A also have teeth $a'$ which engage the teeth of the sprocket wheels around which the chain passes. The teeth, in the present instance, have extended bearings $a^2$ so as to increase the bearing surface of the teeth against the sprocket wheels. This feature, however, forms no part of my present invention. The link plates A are what may be termed the intermediate link plates of the chain, while the link plates C, Figs. 1 and 6, are the end link plates and these link plates have portions $c$ which partly close the pivot pin openings and the pivot pins are prevented from moving longitudinally to any great extent by these portions $c$—$c$ of the end plates, as illustrated in Fig. 4. The U-shaped slot $c'$ between the body of the link plates and the portion $c$ is for the reception of the extended bearing $e$ of the adjoining link plate A, so that the bearing of the several link plates on the pivot pin is, in the present instance, throughout the length of the pivot pin. The link plates are recessed at $e'$ and $c^2$ respectively to form center bearings $n$.

In order to hold the link plates together, I provide clips F, which have arms $f$ as illustrated in Fig. 7. These clips extend through the space between the teeth of the link plates, as clearly illustrated in Fig. 1, and the ends of the arms are turned into recessed portions $c^2$—$c^2$ of the end plates C, firmly holding the link plates together, and, as the portions $c$ of the said end plates extend over the ends of the pivot pins, the pivot pins are held in proper position. By this construction the pivot pins are free to turn independently of either set of link plates. In gripping the links at the point indicated, the link plates are rigidly held at the center and are allowed a certain amount of spring at the ends, which is preferable in chains of this type, although not essential, but it makes a more evenly running chain.

In place of making the clips F from a round bar, as illustrated in Fig. 7, the clip may be made from a flat bar F', as illustrated in Fig. 9.

I claim:

1. The combination in a chain of a series of link plates, pivot pins coupling the several sections of the link plates, the outside link plates having portions extending over the ends of the pivots, and transversely arranged clips independent of the pivots for securing the linked plates together.

2. The combination in a chain of a series of link plates, plain cylindrical pins coupling said plates, the outside plates having portions extending over the ends of the pins so as to retain them in position, each link plate having teeth to engage the teeth of the sprocket wheels, with means extending from one side of the chain to the other in the space between the teeth and engaging the end plates, for holding the plates together.

3. The combination in a chain, of a series of link plates, plain pivot pins having an even diameter throughout coupling the link plates, each inner link plate having openings for the pivot pins and having teeth arranged to engage the teeth of the sprocket wheel and offset at the center, with a clip extending transversely between the teeth of a series of link plates, the arms of the clip being bent over and entering the offset portions of the link plates, said end link plates having portions which extend over the ends of the pivot pins holding them in place.

4. The combination in a chain, of a series of links composed of link plates having pivot pin openings and extended bearings at the openings, a series of plain cylindrical pivot pins coupling the links, the pivot pin openings in the intermediate link plates being shaped to receive the extended bearings of adjoining links, end link plates having portions extending over the ends of the pivot pins leaving U-shaped slots for the reception of extended bearings of adjoining link plates, with clips extending across the chain in the space between the teeth, the clips engaging the end link plates.

5. The combination of a link consisting of a series of plates arranged side by side, each plate having two teeth; with a clip extending transversely in the space between the teeth; and having arms bearing upon the outside plates and holding the plates in position.

6. The combination in a chain link, of a series of plates arranged side by side; said plates having projecting teeth spaced apart; with a spring clip extending transversely in the space between the teeth and having arms projecting on the outside of each outside link; the arms being turned in at their ends and arranged to enter recesses formed in said outside links, whereby the several links are held together.

7. The combination of a chain made of a series of links; pivot pins connecting the links; each link consisting of a series of plates arranged side by side; the links having teeth; the teeth being spaced apart so as to form transverse recesses; with clips extending transversely in alternate recesses and bearing upon the outside link plates of each alternate link.

In testimony whereof, I have signed my name to this specification, in the presence of two subscribing witnesses.

JAMES M. DODGE.

Witnesses:
W<small>M</small>. E. S<small>HUPE</small>,
W<small>M</small>. A. B<small>ARR</small>.